Jan. 4, 1949.  W. E. PHILLIPS  2,458,196
APPARATUS FOR DETERMINING THE CUTTING AND CHIPPING
RESISTANCE OF PLASTIC AND RUBBER-LIKE MATERIALS
Filed Aug. 30, 1945  2 Sheets-Sheet 1

Inventor
Warren E. Phillips
By Nore S. Woodruff
Atty.

Jan. 4, 1949.  W. E. PHILLIPS  2,458,196
APPARATUS FOR DETERMINING THE CUTTING AND CHIPPING
RESISTANCE OF PLASTIC AND RUBBER-LIKE MATERIALS
Filed Aug. 30, 1945  2 Sheets-Sheet 2
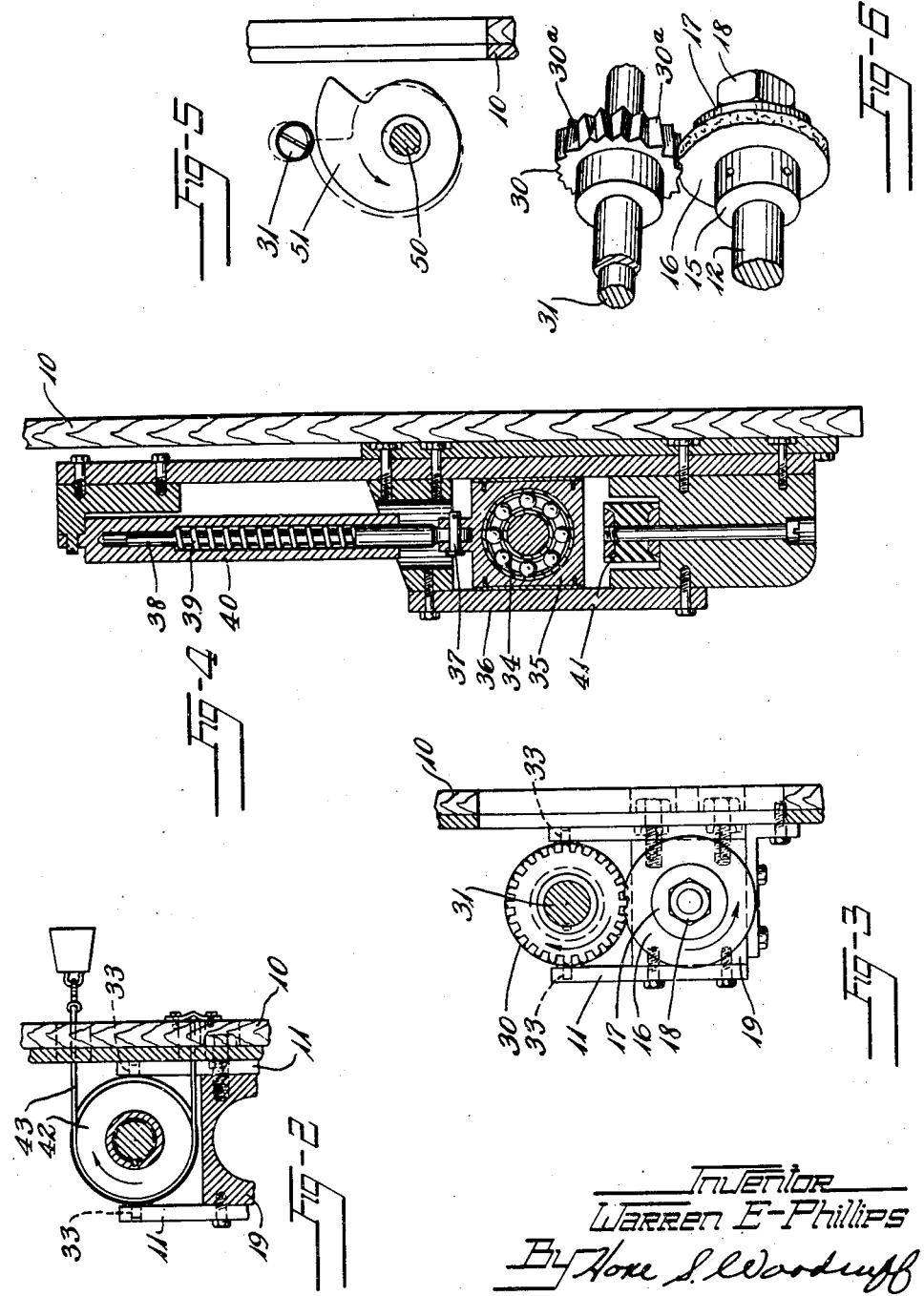
Inventor
Warren E. Phillips Patented Jan. 4, 1949

2,458,196

UNITED STATES PATENT OFFICE 2,458,196

APPARATUS FOR DETERMINING THE CUTTING AND CHIPPING RESISTANCE OF PLASTIC AND RUBBERLIKE MATERIALS

Warren E. Phillips, Cuyahoga Falls, Ohio, assignor to The B. F. Goodrich Company, New York, N. Y., a corporation of New York Application August 30, 1945, Serial No. 613,676

8 Claims. (Cl. 73—12)

This invention relates to apparatus for testing of plastic and rubber-like materials and more particularly to apparatus for determining the cutting and chipping resistance of such materials.

Cutting and chipping are among the principal causes of failure of natural and synthetic rubber tire treads. Cutting and chipping also cause failure of rubber and synthetic rubber conveyor belts where materials such as iron ore, limestone and gravel are carried. Heretofore it has been impossible to determine cutting and chipping resistance of these materials with accuracy for no satisfactory test or testing apparatus has been available. Ordinary abrasion-type testing machines do not reveal significant differences in cutting and chipping resistance of plastic and rubber-like materials.

The principal objects of the present invention accordingly are to provide improved apparatus for testing plastic and rubber-like materials, particularly those materials used in tires, belts, and the like, and especially to provide improved testing apparatus for reliably indicating the wearing qualities of plastic and rubber-like materials, particularly the resistance of such materials to cutting and chipping; to provide improved testing apparatus which will reveal small differences between the resistances of successive samples of plastic and rubber-like materials; and to provide improved testing apparatus of the character described which will permit the testing of small laboratory size samples of plastic and rubber-like materials rather than testing the finished products.

These and other objects will appear from the following description and the accompanying drawings.

Of the drawings,

Fig. 2 is a sectional view taken along the line 2—2 of Fig. 1;

Fig. 3 is a sectional view taken along the line 3—3 of Fig. 1;

Fig. 4 is a cross-sectional detail view taken along the line 4—4 of Fig. 1;

Fig. 5 is a sectional detail view taken along the line 5—5 of Fig. 1; and

Fig. 6 is a fragmentary perspective view showing more clearly the test sample disc and the toothed cutting and chipping wheel in contact as in the embodiment of the other figures.

Figure 1:
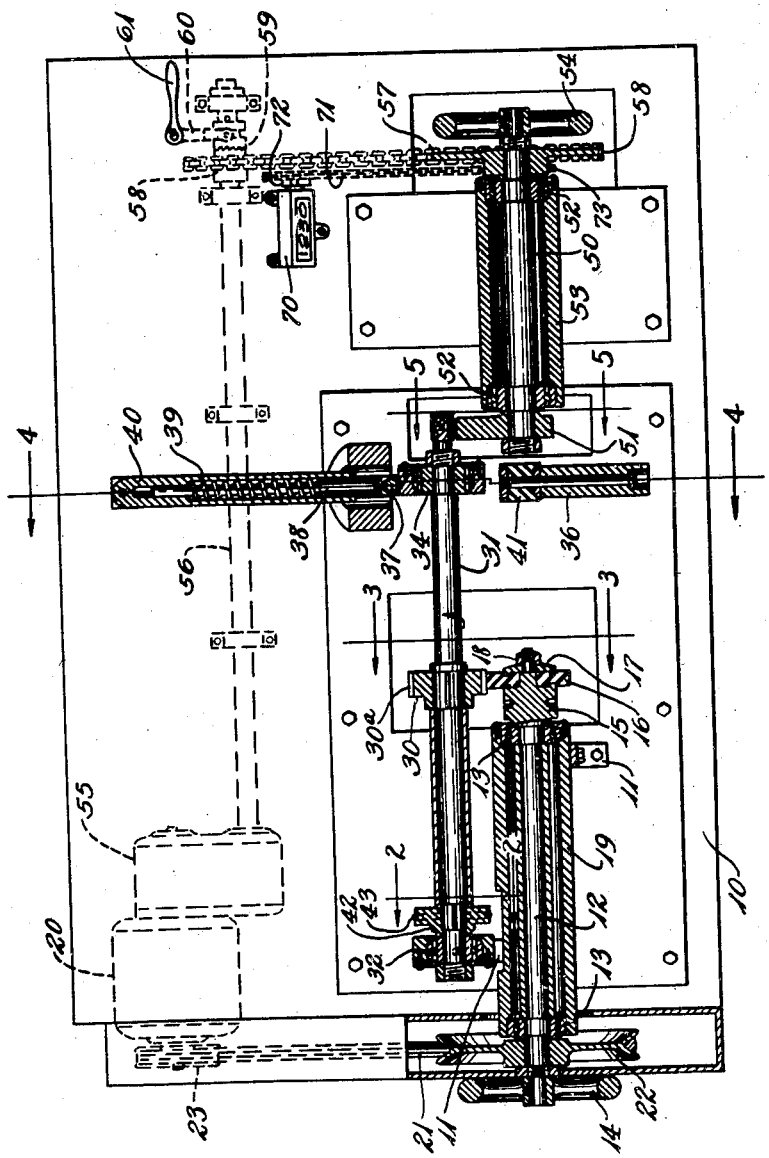
Fig. 1 is a plan view in section of an illustrative embodiment of the apparatus of this invention.

According to the invention a small disc of the material to be tested is mounted in a chuck or on a spindle and rotated at high speed, for example 1500 R. P. M. A rotatably mounted toothed gear-like cutting and chipping wheel preferably having irregular teeth and fitted with a braking mechanism is brought into contact with the circumference of the rapidly rotating test-disc and held there by a strong compression spring or equivalent means. A certain amount of slip between the rotating sample and the gear-like cutting and chipping wheel is effected by loading the braking mechanism. The toothed cutting and chipping wheel also may be caused to move into and out of contact with the circumference of the rapidly rotating test-disc with a regular pounding action. While the cutting and chipping wheel is in contact with the test disc the wheel is driven by the test disc by friction. The pounding action causes the teeth of the cutting and chipping wheel to strike the circumference of the test disc with impact sufficient in most cases to start a series of small cuts in the circumference of the test disc. During the interval between impacts, the frictional drag between the test disc and the wheel causes the teeth of the cutting and chipping wheel to begin abrading the cuts started by the preceding impact in a chipping manner. After a determinate number of impacts the condition of the test disc may be inspected, the results recorded and the test continued with periodic inspection until the sample fails. Alternatively similar samples may be run for the same number of rotations and impacts and their relative conditions noted.

Referring to the drawings, a typical apparatus embodying the invention may conveniently be mounted upon a table-like bench 10, preferably built of angle iron or the like for rigidity. On the table top are fastened brackets 11, 11 upon which a shaft 12 is journaled in ball bearings 13, 13. At one end of shaft 12 is provided a hand wheel 14 for manual rotation of shaft 12 and at the other end thereof is provided a spindle 15 for mounting a disc-like sample 16 of the material to be tested, the sample disc 16 being held against the spindle by a plate 17 and a nut 18. A housing 19 completely surrounds shaft 12 to protect the operator. Shaft 12 is driven at a high speed by an electric motor 20 acting through V-belt 21 and pulleys 22, 23. In contact with the sample disc 16 is a toothed gear-like cutting and chipping wheel 30 which rotates on a shaft 31 parallel and adjacent to shaft 12. One end of shaft 31 is journaled in ball bearings 32 which are pivoted in bracket 11 by means of pins 33, 33 and the other end of shaft 31 is journaled in ball bearings 34 which are slidably mounted in a cross head 35 and cross head housing 36 to permit sidewise movement of shaft 31 away from shaft 12. Fastened to cross head 35 by means of pin 37 is a spring return mechanism for resiliently maintaining the cutting and chipping wheel 30 in contact with the sample disc 16. The return mechanism consists of a long sliding rod 38 upon which is coiled a helical spring 39. The rod 38 and spring 39 are held in a housing 40 so as to oppose any sidewise movement of shaft 31. Housing 36 is provided with a rubber shock absorber 41 to take the impact when the sample disc fails or becomes worn. Shaft 31 is provided at a point between the bearing 32 and the cutting and chipping wheel 30 with a Prony brake consisting of a pulley 42 and a weighted band 43. A cam shaft 50 is mounted upon the table 10 in a position to engage shaft 31 with an eccentric cam 51. Cam shaft 50 is journaled in ball bearings 52, 52 and provided with a housing 53. A hand wheel 54 is provided on one end of the cam shaft 50 to permit hand operation of the cam 51, when desired. Cam shaft 50 may be driven by electric motor 20 through a gear-reduction box 55, an extended shaft 56, chain 57, and sprockets 58, 58. A separate motor may also be provided to drive the cam shaft 50. If the same motor is used to actuate the shaft 12 and the cam shaft 50, a clutch mechanism 59 should be provided to permit rotation of the sample without action of the cam shaft. A lever and arm linkage 60 may be disposed so that a handle 61 is conveniently located on top of the table 10. When the cam 51 engages the shaft 31, the shaft 31 is displaced in the cross head housing and moved sidewise away from shaft 12, such that the cutting and chipping wheel 30 is taken out of contact with the sample disc. After further movement of the cam 51 the shaft 31 is released and the spring return mechanism returns shaft 31 to its original position causing the cutting and chipping wheel 30 to strike the sample disc with considerable impact. A revolution counter 70 for recording the number of impacts is connected to the cam shaft 50 by a small chain 71 traveling over sprockets 72, 73.

To accentuate the cutting and chipping effect of the test, the wheel 30, as illustrated most clearly in Fig. 6, is provided with a peripheral series of fairly sharp upstanding teeth 30a, 30a, preferably disposed in irregular or staggered arrangement and with the cutting edges or peaks of the teeth also being angularly disposed with respect to the axis of rotation of the wheel. As may be seen from Fig. 6, a preferred arrangement comprises successive teeth 30a, 30a, disposed in non-parallel or angular relation to each other and desirably in alternating angular dispositions, the peaks or cutting edges of successive teeth also being disposed at alternating opposite angles to the axis of rotation.

To determine the performance of materials for tires and conveyor belts under conditions to which they are apt to be subjected, it is sometimes desirable to maintain the test sample at elevated temperatures of the order of 200 degrees Fahrenheit or more. In such instances, the apparatus of the present invention may be provided with a heater oven surrounding the rotating test-disc and the cutting and chipping wheel. To facilitate the operation of this apparatus and to reduce the manual operations involved in the testing of samples, the motor switch, the switch for a device to actuate the clutch, the heater control switches and an automatic electrical counting mechanism may be brought together in a central panel. For reasons of simplicity and clarity of the drawings this has not been shown.

The operation of the apparatus is as follows:

The test-disc 16 of the material preferably about two inches in diameter may be prepared by stamping it out of sheet material or preferably, it may be prepared by molding the disc and thereby obtain more uniform edges and good dynamic balance. The test-disc is mounted upon the chuck or spindle 15 and the motor 20 started with the clutch 57 disengaged to render the cam shaft 50 inoperative. The cutting and chipping wheel 30 is brought into contact with the rapidly rotating test-disc as shown in Fig. 6, and allowed to remain in contact for one minute until the friction has "warmed" up the sample. Then the clutch 59 is engaged to start the cutting and chipping wheel in its reciprocating motion. After a determinate number of impacts, for example one hundred, the motor is shut off and the sample examined. At intervals of one hundred impacts the sample is inspected and its appearance noted, the test usually being continued until the disc fails. The test results are classified by comparing the appearance of the test-disc to prepared samples or standard blank runs.

The conditions of the test may be varied by changing the stiffness of the spring in the spring return mechanism, by applying different loadings to the Prony brake and by changing the configuration of the cutting and chipping wheel. However, a standard procedure may be worked out calling for a certain spring loading, a given brake load, and a standard cutting and chipping wheel.

The apparatus of this invention is particularly designed to subject the sample discs to an accelerated test under cutting and chipping conditions analogous to that suffered by tires, conveyor belts and the like in actual service. The apparatus is sufficiently simple in operation that semi-skilled female operators may be used to perform the tests and obtain reproducible results. The test performed by the apparatus of the invention is sufficiently critical to permit the evaluation of the effect of small changes in the kind and amount of various compounding agents. The apparatus of this invention has proved to be an effective tool to the experimental rubber compounder and has made possible improvements in tires, conveyor belts and the like.

Variations may be made without departing from the scope of the invention as it is defined in the accompanying claims.

I claim:

1. Testing apparatus comprising, in combination, means for rotatably mounting a disc-like sample member of the material to be tested, a rotatable toothed gear-like member mounted for peripheral contact with said sample member, and means for intermittently interrupting the contact between the two rotating members and causing one of said members to strike the other member with impact.

2. Testing apparatus comprising, in combination, means for rotatably mounting a disc-like sample member of the material to be tested, a rotatable toothed gear-like member mounted for peripheral contact with said sample member, means for intermittently interrupting the contact between the two rotating members and causing one of said members to strike the other member with impact, and means for causing a determinate amount of slip between said members.

3. Testing apparatus comprising, in combination, means for rotatably mounting a disc-like sample member of the material to be tested, a rotatable toothed gear-like member mounted for peripheral contact with said sample member, means for intermittently interrupting the contact between said members during rotation thereof and causing said toothed member to strike said sample with impact, means for driving one of said members, and means for braking the other of said members to cause a determinate amount of slip between said members.

4. Testing apparatus comprising, in combination, means for rotatably mounting a disc-like sample member of the material to be tested, a rotatable, gear-like member having sharp irregular teeth in the periphery thereof, said gear-like member being mounted for peripheral contact with said sample, means for intermittently interrupting the contact between said members and causing said toothed member to strike said sample with impact, means for driving said sample, and means for braking said gear-like member for causing a determinate amount of slip between said members.

5. Testing apparatus comprising, in combination, means for rotatably mounting a sample member to be tested, a cutting and chipping member mounted for rotating peripheral contact with the first said member, and driving means for rotating at least one of said members, said cutting and chipping member comprising a peripheral series of sharp-edged teeth and grooves arranged in irregular fashion with successive teeth inclined at opposite angles.

6. Testing apparatus comprising, in combination, means for rotatably mounting a sample member to be treated, a cutting and chipping member mounted for rotating peripheral contact with the first said member, and driving means for rotating one of said members, said cutting and chipping member comprising a peripheral series of sharp-edged teeth and grooves arranged in irregular fashion with successive teeth disposed in angular relation to each other and with successive cutting edges disposed at different angles to the axis of rotation.

7. Testing apparatus comprising, in combination, means for rotatably mounting a sample member of the material to be tested, a rotatable cutting and chipping roller member having a serrated periphery mounted for peripheral contact with said sample member, means for rotating at least one of said members, and means for intermittently interrupting the peripheral contact between the two rotating members and for causing said members to strike together with impact.

8. Testing apparatus comprising, in combination, means for rotatably mounting a sample member to be tested, a cutting and chipping roller member mounted for rotating peripheral contact with the first said member, said roller member having alternate axially disposed ribs and grooves on its periphery, said ribs having sharp projecting edges the surface of which is defined by two intersecting planes each of which forms an acute angle with the radius of said roller member which passes through the intersection of said planes, means for rotatably driving at least one of said members, and means for intermittently interrupting the peripheral contact between said members and for causing said members to strike together with impact.

WARREN E. PHILLIPS.

REFERENCES CITED

The following references are of record in the file of this patent:

UNITED STATES PATENTS

| Number | Name | Date |
| --- | --- | --- |
| 1,478,532 | Schafer | Dec. 25, 1923 |
| 1,875,786 | Warner | Sept. 6, 1932 |
| 2,010,049 | Abbott, Jr., et al. | Aug. 6, 1935 |
| 2,028,190 | Burns | Jan. 21, 1936 |